US008145128B2

(12) United States Patent
Malik et al.

(10) Patent No.: US 8,145,128 B2
(45) Date of Patent: Mar. 27, 2012

(54) WIRELESS RECEPTION APPARATUS, WIRELESS TRANSMISSION APPARATUS, WIRELESS COMMUNICATION SYSTEM, WIRELESS RECEPTION METHOD, WIRELESS TRANSMISSION METHOD, AND WIRELESS COMMUNICATION METHOD

(75) Inventors: Rahul Malik, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 765 days.

(21) Appl. No.: 11/911,335

(22) PCT Filed: Apr. 14, 2005

(86) PCT No.: PCT/JP2005/007582
§ 371 (c)(1),
(2), (4) Date: Jan. 24, 2008

(87) PCT Pub. No.: WO2006/112032
PCT Pub. Date: Oct. 26, 2006

(65) Prior Publication Data
US 2009/0061786 A1    Mar. 5, 2009

(51) Int. Cl.
*H04B 17/00* (2006.01)
*H04B 1/00* (2006.01)
*H04B 7/00* (2006.01)
*H04B 7/02* (2006.01)
*H03C 7/02* (2006.01)

(52) U.S. Cl. ......... 455/39; 455/67.11; 455/69; 455/101; 375/299

(58) Field of Classification Search ............... 455/67.11, 455/69, 101, 115.1, 226.1, 39; 370/328; 375/299, 358
See application file for complete search history.

(56) References Cited

U.S. PATENT DOCUMENTS

| | | | | |
|---|---|---|---|---|
| 6,859,503 | B2 * | 2/2005 | Pautler et al. | 375/299 |
| 7,477,695 | B2 * | 1/2009 | Takano | 375/261 |
| 7,492,829 | B2 * | 2/2009 | Lin et al. | 375/267 |
| 7,616,695 | B1 * | 11/2009 | Sarrigeorgidis | 375/260 |
| 7,676,007 | B1 * | 3/2010 | Choi et al. | 375/347 |
| 7,680,461 | B2 * | 3/2010 | Takano | 455/69 |
| 7,711,762 | B2 * | 5/2010 | Howard et al. | 708/490 |
| 2003/0235255 | A1 | 12/2003 | Ketchum | |
| 2004/0002364 | A1 * | 1/2004 | Trikkonen et al. | 455/562.1 |
| 2004/0082356 | A1 | 4/2004 | Walton | |
| 2004/0203473 | A1 | 10/2004 | Liu | |

(Continued)

FOREIGN PATENT DOCUMENTS

JP    2005-033335    2/2005

(Continued)

OTHER PUBLICATIONS

Japanese Office Action dated Oct. 13, 2009.

(Continued)

*Primary Examiner* — Simon Nguyen
(74) *Attorney, Agent, or Firm* — Dickinson Wright PLLC

(57) ABSTRACT

The present invention relates to an apparatus and a method capable of achieving closed loop MIMO communications, using reduced feedback, without a loss in system performance. In one embodiment of the present invention, a phase-rotated right handed singular vector matrix is derived from an estimation result of a MIMO channel (steps 231 and 232). Then, a coefficient are fed back (step 235). The coefficient is associated with an element in the phase-rotated right-handed singular vector matrix.

14 Claims, 5 Drawing Sheets

U.S. PATENT DOCUMENTS

| | | | |
|---|---|---|---|
| 2004/0234004 A1 | 11/2004 | Ketchum | |
| 2005/0048933 A1 | 3/2005 | Wu | |
| 2005/0129137 A1 | 6/2005 | Yamada | |
| 2006/0176939 A1* | 8/2006 | Goldberg | 375/148 |
| 2006/0193294 A1* | 8/2006 | Jorswieck et al. | 370/334 |

FOREIGN PATENT DOCUMENTS

| | | |
|---|---|---|
| JP | 2005 160030 | 6/2005 |

OTHER PUBLICATIONS

PCT International Search Report dated Jul. 7, 2005.

"Local and Metropolitan Area Networks-Specific Requirements—Part 11: Wireless LAN Medium Access Control (MAC) and Physical Layer (PHY) specifications: Higher-Speed Physical Layer Extension in the 5 GHz Band," IEEE Std 802.11a-1999, IEEE, Sep. 1999, pp. i-83.

G. Foschini, et al. "On limits of wireless communications in fading environments when using multiple antennas," Wireless Personal Communications, Mar. 1998, pp. 311-335.

M. Wennstrom, "Promises of Wireless MIMO Systems," Upsala University, Sweden, 1999, 25 pages total.

J. Sung, "Transmitter Strategies for Closed-Loop MIMO-OFDM," PhD thesis submitted to School of Electronic and Computer Engineering, Georgia Institute of Technology, Jul. 2004, pp. i-161.

J. Ketchum, et al. "System Description and Operating Principles for High Throughput Enhancements to 802.11," doc: IEEE 802.11-04/870r0, Aug. 2004, pp. i-135.

L. Litwin, "Comprehending the technology behind the UMTS wideband CDMA physical layer," RF Signal Processing, Nov. 2002, pp. 50-58.

E. Weisstein, "Singular Value Decomposition," From *MathWorld*—A Wolfram Web Resource, 1999-2007, 2 pages total.

"Multiple-Input Multiple Output in UTRA," 3GPP TR 25.876 v1.7.0, Aug. 2004, pp. 1-53.

D. Love, et al. "What is the Value of Limited Feedback for MIMO Channels?", IEEE Communications Magazine, Oct. 2004, pp. 54-59.

"High Speed Downlink Packet Access (HSDPA)—Overall Description," 3GPP TS 25.308, V6.3.0, Dec. 2004, pp. 1-28.

G. Raleigh, et al. "Spatio-temporal coding for wireless communications," Global Telecommunications Conference, 1996, pp. 1809-1814.

\* cited by examiner

WIRELESS RECEPTION APPARATUS, WIRELESS TRANSMISSION APPARATUS, WIRELESS COMMUNICATION SYSTEM, WIRELESS RECEPTION METHOD, WIRELESS TRANSMISSION METHOD, AND WIRELESS COMMUNICATION METHOD

TECHNICAL FIELD

The present invention relates to a wireless reception apparatus, a wireless transmission apparatus, a wireless communication system, a wireless reception method, a wireless transmission method, and a wireless communication method.

BACKGROUND ART

Of late, there has been a dramatic growth in the capacity of wireless communication networks—Cellular networks have grown from analog "voice-only" systems to current $3^{rd}$ Generation networks that provide a maximum download capacity of 2 Mbps—catering to voice, data and multimedia services; Wireless LANs have evolved from initial data rates of 2 Mbps specified by the IEEE 802.11-99 specification [refer to "Local and Metropolitan Area Networks—Specific Requirements—Part 11: Wireless LAN Medium Access Control (MAC) and Physical Layer (PHY) specifications", IEEE Std802.11-1999, IEEE, August 1999] to the present IEEE 802.11a specification [refer to "Local and Metropolitan Area Networks—Specific Requirements—Part 11: Wireless LAN Medium Access Control (MAC) and Physical Layer (PHY) specifications: Higher-Speed Physical Layer Extension in the 5 GHz Band", IEEE Std 802.11a-1999, IEEE, September 1999] that provide link rates of up to 54 Mbps.

To satiate the need for greater data rates, standardization for a are currently developing the next generation wireless standards.

<MIMO>

At the core of enhancing the capacity of several next generation wireless systems is MIMO—multiple-input-multiple-output—a technology that when applied to wireless communications employs the use of $N_T$ transmit antennas and $N_R$ receive antennas to better effect communication. The use of multiple antennas offers the flexibility of choosing from spatial-multiplexing gain—where a dramatic increase in spectral efficiency, up to $\min(N_T, N_R)$ times that of a conventional single antenna (SISO) system [refer to "On limits of wireless communications in fading environments when using multiple antennas," Wireless Personal Communications, pp. 36-54, March 1998] can be realized; or, diversity gain—where up to $N_T N_R$ paths that exist between transmitter and receiver may be used to exploit the diversity in the channel, leading to higher link-reliability in the wireless channel. In general, there are tradeoffs between increased data-rate (spatial-multiplexing) and increased reliability (diversity).

<Feedback>

In realistic scenarios, wireless communication systems suffer from a range of impairments. These range from non-ideal device behavior in the transceiver itself, to variability/selectivity of the channel—in the time, frequency and spatial domains. Feedback in a communications system can enable the transmitter to exploit channel conditions and avoid interference. In the case of a MIMO channel, feedback can be used to specify a pre-coding matrix at the transmitter that facilitates the exploitation of the strongest channel modes, or, the inherent diversity of the channel [refer to "What is the Value of Limited Feedback for MIMO Channels?", IEEE Communications Magazine pp. 54-59, October 2004].

An example of a closed loop MIMO system is one implementing eigen-mode spatial-multiplexing—where the transmitter and receiver, having channel state information (CSI), use a transform such as the singular value decomposition (SVD), to convert the MIMO channel into a bank of scalar channels, with no cross-talk between channels [refer to "Promises of Wireless MIMO Systems," http://www.signal.uu.se/courses/semviewgraphs/mw_011_107.ppt]. Eigen-mode spatial-multiplexing is an optimal space-time processing scheme in the sense that it achieves full diversity and full multiplexing gains of the channel [refer to "Transmitter Strategies for Closed-Loop MIMO-OFDM," PhD thesis submitted to School of Electronic and Computer Engineering, Georgia Institute of Technology, July 2004]. The detection complexity of the eigen-mode spatial-multiplexing scheme increases only linearly with the number of antennas (in contrast to the optimum maximum likelihood sequence estimator (MLSE), which is open-loop but has an exponential complexity, rendering it intractable for implementation in practical systems).

In order to realize the benefits of eigen-mode spatial-multiplexing a.k.a. eigen-beamforming, CSI is required at the transmitter. An intuitive way of achieving this is to merely feedback the estimated channel state to the transmitter. However, feedback detracts from the payload carrying capacity of the system and is hence an expense, which must be minimized.

In the above-mentioned PhD thesis, the application of eigen-beamforming to a time division duplex (TDD) system is described. Although the 'over the air channel' is reciprocal, the cascading of different transmit and receive RF chains on both ends of the link render the base-band channel non-reciprocal. Once appropriate calibration (not described in the thesis) is performed, the transmit and receive-filter matrices required to facilitate eigen-beamforming are described by simple reciprocal arrangements at both ends of the link.

In US Patent Application Publication 2004/0082356A1, the authors describe a calibration scheme and the use of eigen-beamforming in the context of a WLAN network. In the described system, calibration is performed through the explicit feedback of channel estimates derived by the terminal from a training sequence transmitted by the base-station. The base-station obtains a similar estimate of the reverse channel from a training sequence transmitted by the terminal and computes a set of calibration coefficients that are explicitly fed back to the terminal and used by both the base-station and the terminal to render the base-band channel reciprocal. Once calibrated, channel decomposition (based on channel estimates derived from the training sequence transmitted by the base-station) is performed by the terminal to derive a set of transmit and receive filters required for eigen-beamforming by the terminal. Feedback of these filters to the base-station is performed implicitly, by means of a specially modulated training sequence, known in "System Description and Operating Principles for High Throughput Enhancements to 802.11," doc: IEEE 802.11-04/870r0, as a steered sequence, from which the base-station can directly derive its receive-filter and correspondingly (from the reciprocality principle), its transmit-filter.

As TDD renders smaller capacities owing to the need for large guard-bands to counter the channel delay-spread, particularly in macro-cellular environments, cellular systems are prevalently frequency division duplex (FDD) [refer to "Comprehending the technology behind the UMTS wideband CDMA physical layer," RF Signal Processing pp. 50-58, November 2002]. Although the uplink and downlink channels in FDD cellular systems are correlated to the extent that they typically share similar delay-spreads and power-delay profiles, for all other practical intents and purposes, they are considered uncorrelated. Hence, in order to perform eigen-beamforming, FDD systems cannot make use of feedback schemes that exploit channel reciprocality. Explicit feedback of the channel coefficients or related information must be used instead.

In US Patent Application Publication 2004/0234004A1, the authors describe a transceiver scheme whereby channel decomposition is performed in the frequency-domain, but transmit and receive filtering associated with eigen-mode spatial-multiplexing is performed in the time domain. The described receiver estimates the channel coefficients and performs a singular-value decomposition in order to derive a set of receive steering vectors. The channel coefficients are fed-back to the transmitter, which performs a second singular value decomposition in order to derive the appropriate set of transmit steering vectors. In general, the described system explicitly calls for the feedback of the channel coefficients from the receiver to the transmitter.

In US Patent Application Publication 2003/0235255A1, the authors describe methods by which water-filling may be used to enhance the capacity of an eigen-mode spatially multiplexed system. In order to realize the channel eigen-modes and corresponding transmit and receive filters, the specification describes a process similar to the above-mentioned US Patent Application Publication 2004/0234004A1, whereby the channel coefficients are explicitly fed back from transmitter to receiver.

In US Patent Application Publication 2004/0203473A1, the author describes methods by which a receiver may compute a bounded set of eigen-vectors, facilitating quantization over limited ranges of number-space for a system with two transmit antennae. While the proposed method achieves a reduction in feedback information by selecting a solution of eigen-vectors that results in relationships between elements of individual eigen-vectors, the method is limited to a system with two transmit antennae.

<Singular Value Decomposition>

The objective of eigen-mode spatial-multiplexing is to diagonalize the channel, rendering a vector channel into a group of individual scalar channels, there being no cross-talk between spatial channels (eigen-modes). The optimum transmit and receive steering matrices can be found using a singular value decomposition, as described in the following.

Assuming an $N_{Rx} \times N_{Tx}$ matrix [H]: [H] can be represented as a product of matrices of the form specified in equation (1) [refer to "Singular Value Decomposition," http://mathworld.wolfram.com/SingularValueDecomposit ion.html], $$[H]=[U]\cdot[D]\cdot[V]^H \quad (1)$$

where, [U] and [V] are unitary matrices of the left and right-handed singular-vectors and having dimension $N_{RX} \times N_{RX}$ and $N_{TX} \times N_{TX}$, respectively; and [D] is an $N_{RX} \times N_{TX}$ matrix containing the singular-values of [H] along its diagonal. It may be worthwhile to note that there are $\min(N_{TX}, N_{RX})$ positive non-zero singular-values of [H], the remainder of the elements of [D] being zero. Each positive singular-value corresponds to the gain on the corresponding spatial-mode (or eigen-beam) of the channel.

In the context of equation (1) and the remainder of this specification, the notation $[A]^H$ for a matrix [A] denotes the Hermitian of the matrix [A].

The singular-values and singular-vectors of a matrix are closely related to its eigen-values. In the context of the matrix [H] in equation (1), [U] and [D] correspond to the matrices of eigen-vectors and positive square roots of the eigen-values, respectively, of the left-handed matrix product $[H]\cdot[H]^H$; while [V] and [D] correspond to the matrices of eigen-vectors and positive square roots of the eigen-values of the right-handed matrix product $[H]^H\cdot[H]$.

Based on the definitions above, it is further worthwhile to note that in the context of a non-square matrix [H], the singular-vector matrices [U] and [V] contain some trivial singular-vectors, corresponding to singular-values of zero. As such, there exists an 'economy-size' singular value decomposition in which [D] is always a square diagonal matrix of dimension corresponding to $\min(N_{TX}, N_{RX})$ and [U] and [V] are matrices of the non-trivial singular-vectors of the system.

<Eigen-Mode Spatial-Multiplexing>

In a system based on eigen-mode spatial-multiplexing, the receiver estimates the channel from the transmitter to the receiver—[H], and performs a singular value decomposition to determine the matrix of left-handed singular-vectors—[U]. The receiver also feeds back the channel state information (e.g.: [H], as per US Patent Application Publication 2004/0234004A1 and US Patent Application Publication 2003/0235255A1, both of which are mentioned above) to the transmitter, which in turn performs a second singular value decomposition to determine the matrix of right-handed singular-vectors—[V].

Assuming that the transmitter performs spatial-multiplexing, transmitting data [x], the received signal, [y], can be represented by equation (2)

$$[y]=[H]\cdot[x]+[n] \quad (2)$$

where, [n] represents noise, which in the context of wireless systems, is typically modeled as an additive white Gaussian variable with finite power.

An open-loop receiver, for example the zero-forcing (ZF) detector, would determine an estimate of the transmitted data as:

$$[\hat{x}]=[H]^{-1}\cdot[y] \quad (3)$$

The problem with such an approach is the noise-enhancement effect, which results in a signal-to-noise-ratio (SNR) degradation at the receiver [refer to "Digital Communications 3ed", McGraw-Hill, March 1995].

In order to effect eigen-mode spatial-multiplexing, the transmitter pre-filters the data [x], with a transmit steering matrix—[V], and the receiver applies a matched-filter—$[U]^H$ to the received signal, [y]. Equation (4) represents the received signal, while equation (5) depicts the matched-filtering applied by the receiver to estimate the transmitted data.

$$[y]=[H]\cdot[V]\cdot[x]+[n] \quad (4)$$

$$[\hat{x}]=[U]^H\cdot[y] \quad (5)$$

Expanding [H] as per equation (1), we obtain equation (6):

$$[\hat{x}]=[D]\cdot[x]+[U]^H\cdot[n] \quad (6)$$

It can be seen from equation (6) that the eigen-beamforming method results in perfect decoupling (i.e. no cross-talk) between streams and an SNR gain proportional to the square of the singular-values of the channel. The SVD method can be applied to any size and any rank of channel matrix since the SVD exists for any matrix [refer to "Singular Value Decomposition," http://mathworld.wolfram.com/SingularValueDecomposit ion.html, which is mentioned above]. Finally and most importantly, eigen-mode spatial-multiplexing is optimal in the information theoretical sense since unitary filters preserve information.

DISCLOSURE OF INVENTION

It is an object of the present invention to provide a wireless reception apparatus, a wireless transmission apparatus, a wireless communication system, a wireless reception method, a wireless transmission method, and a wireless communication method capable of achieving closed loop MIMO communications, using reduced feedback, without a loss in system performance.

According to an aspect of the present invention, a wireless reception apparatus comprises a derivation section that derives a phase-rotated right-handed singular vector matrix from an estimation result of a MIMO channel; and a feedback section that feeds back, to a wireless transmission apparatus, a coefficient associated with an element of the phase-rotated right-handed singular vector matrix derived by said derivation section.

According to another aspect of the present invention, a wireless transmission apparatus comprises an acquisition section that acquires a coefficient which is fed back from a wireless reception apparatus; a generation section that generates a transmission filter by substituting the coefficient acquired by said acquisition section in a predetermined relation; and an application section that applies the transmission filter generated by said generation section to data to be transmitted to said wireless reception apparatus via a MIMO channel.

According to a further aspect of the present invention, a wireless communication system comprises the above-mentioned wireless reception apparatus and the above-mentioned wireless transmission apparatus.

According to a yet further aspect of the present invention, a wireless reception method comprises a derivation step of deriving a phase-rotated right-handed singular vector matrix from an estimation result of a MIMO channel; and a feedback step of feeding back a coefficient associated with an element of the phase-rotated right-handed singular vector matrix derived in said derivation step.

According to a yet further aspect of the present invention, a wireless transmission method comprises an acquisition step of acquiring a fed-back coefficient; a generation step of generating a transmission filter by substituting the fed-back coefficient acquired in said acquisition step in a predetermined relation; and an application step of applying the transmission filter generated in said generation step to data to be transmitted via a MIMO channel.

According to a yet further aspect of the present invention, a wireless communication method comprises the above-mentioned wireless reception method and the above-mentioned wireless transmission method.

BEST MODE FOR CARRYING OUT THE INVENTION

Embodiments of the present invention will be described in detail below with reference to the accompanying drawings.

Figure 1:
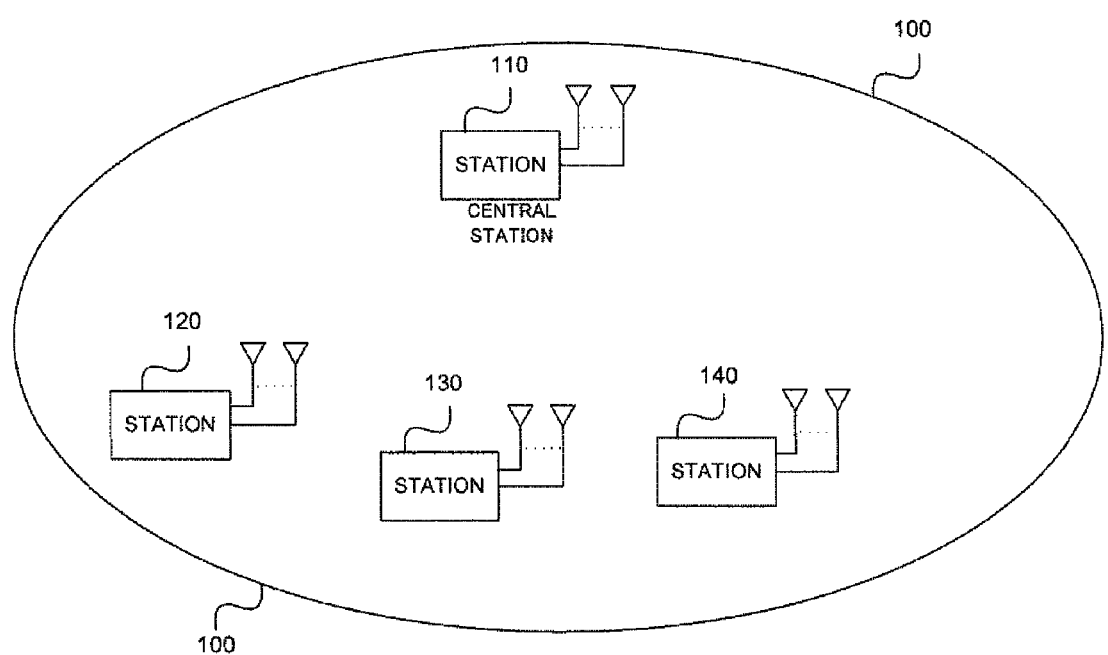
FIG. 1 is a drawing showing a wireless communication system according to one embodiment of the present invention.

FIG. 1 is exemplary of a typical wireless network and is used as reference in describing the teachings of the present invention. It is not however to be construed that the applicability of the invention is limited to a system with an architecture described by FIG. 1. Reference numeral 100 depicts a representative MIMO wireless communication network comprising of a central-station 110 and a plurality of terminal-stations—120, 130, and 140. The central-station 110 and terminals 120, 130, and 140 are assumed to be equipped with a singularity or plurality of antennae, with cost, size and functional-requirements dictating—the typical central-station having a larger number of antennae compared with terminal-stations.

FIG. 1 may just as easily represent an adhoc network, assuming that the central-station 110 is a peer to other stations (120, 130 or 140). On the other hand, FIG. 1 may represent one cell 100 of a cellular network; if it were assumed that the central station 110 represents the base-station (BS), the terminals 120, 130 and 140 represent the user-equipment (UE). Correspondingly, FIG. 1 may represent a BSS of a wireless LAN. In its simplest form, the present invention may be applied to a point-to-point communications link.

Typical device form-factors of handheld/portable devices, such as cellular phones and PDAs allow antenna configurations of 1 or 2 antennae (operating in the 2~5 GHz frequency band), while a portable computer may practically accommodate even 4 antennae. This is reflected in "Multiple-Input Multiple Output in UTRA", 3GPP TR 25.876 v1.7.0, which describes MIMO system requirements for application to UTRA cellular networks.

Analysis of wireless network usage models, an example of which is provided in "IEEE P802.11 Wireless LANs—Usage Models", doc: IEEE 802.11-03/802r23, May 2004, indicate a greater demand for downlink traffic, as opposed to uplink. Hence, system designers often try to optimize the downlink performance—such as in the case of the HSDPA enhancement in 3GPP [refer to "UTRA High Speed Downlink Packet Access (HSDPA)—Overall Description," 3GPP TS 25.308].

As was pointed out previously, FDD systems—typical of cellular networks, are unable to make use of channel reciprocality, as their TDD counter-parts. Hence, in order to effect eigen-mode spatial-multiplexing, explicit feedback of the channel state is required. This is consistent with the teachings of the above-mentioned US Patent Application Publications. As such, it is anticipated that in the context of cellular networks, closed loop techniques that require a substantial amount of feedback information, would primarily be applied to enhance downlink capacity. The ensuing embodiments describe the application of the present invention to such a system. However, it is to be understood that this application is not limiting to the scope of the invention.

Despite this design assumption—which effectively reduces the feedback signaling to only the uplink, the amount of feedback information is still very substantial—more so in channels with short coherence-times and/or small coherence-bandwidths, where stationarity of the channel can be assumed over shorter spans of time and/or frequency, respectively. Assuming a narrow-band complex channel (i.e. a system limited to the coherence bandwidth of the channel) (Note that this assumption holds true for a single subcarrier of an OFDM system [refer to "Wireless Communications—Principles and Practice 2ed," Prentice Hall, 2002]); the amount of feedback information, in bits, to convey the channel state per-coherence time may be expressed by equation (7).

$$\text{Feedback\_Info}_{N_{Rx} \times N_{Tx}} = 2 \times N_{TX} \times N_{RX} \times m \text{ bits} \quad (7)$$

where, m represents the number of bits quantization per feedback coefficient.

For the practical 2×2 MIMO channel, which we shall use as exemplary of a MIMO system, unless otherwise stated in the remainder of this embodiment, equation (8) depicts the amount of required feedback information per coherence-time, in bits.

$$\text{Feedback\_Info}_{2Rx \times 2Tx} = 8 \times m \text{ bits} \quad (8)$$

As described above, the receiver performs a first singular value decomposition to determine the receive steering matrix [U]. It then feeds back the channel state information [H] to the transmitter, which performs a second singular value decomposition to compute transmit steering matrix [V]. In the above-mentioned US Patent Application Publication 2004/0203473A1, the receiver feeds back channel state information in the form of a transmit steering matrix [V], limited to a system with two transmit antennae. The current-art distinguishes itself from prior-art in that it advocates the feedback of a modified transmit steering matrix [V], for any system with $N_{Tx}$ (where $N_{Tx} > 1$) transmit antennae, by the UE; instead of [H], for reasons that will become apparent in the ensuing embodiments.

Based on the prior-art described by equations (2) and (4)~(6), the feedback of [V] represents sufficient channel-state information in order to perform channel diagonalization and correspondingly, eigen-mode spatial-multiplexing. Also, in the general sense, for the 2×2 channel under consideration, [V] has the same dimensions as [H], therefore having the same feedback requirements, as per equation (8).

The methods of the present invention recognize that although the solution for the singular-values of a matrix are unique, the matrices of singular-vectors—[U] and [V], obtained by a singular value decomposition of the channel [H], are not. The receiver upon estimating the channel matrix [H] computes the singular value decomposition of [H], and obtains a set of left-handed singular-vectors, [U], and right-handed singular-vectors, [V]. For the 2×2 complex channel matrix [H], the [V] and [U] are also 2×2 complex and may be represented as per (9) and (10), respectively:

$$[V] = \begin{bmatrix} v_{11} e^{j\varphi_{11}} & v_{12} e^{j\varphi_{12}} \\ v_{21} e^{j\varphi_{21}} & v_{22} e^{j\varphi_{22}} \end{bmatrix} \quad (9)$$

$$[U] = \begin{bmatrix} u_{11} e^{j\varphi_{11}} & u_{12} e^{j\varphi_{12}} \\ u_{21} e^{j\varphi_{21}} & u_{22} e^{j\varphi_{22}} \end{bmatrix} \quad (10)$$

The methods of the present invention advocate the modification of the transmit-filter matrix in (9) by a unitary phase-rotation filter [T] of the form represented in (11), such that the modified transmit-filter matrix is then defined by equation (12).

$$[T] = \begin{bmatrix} e^{j\alpha_1} & 0 \\ 0 & e^{j\alpha_2} \end{bmatrix} \quad (11)$$

$$\lfloor Tx_{filt} \rfloor = [V] \cdot [T] \quad (12)$$

Corresponding to the introduction of the phase-rotation filter to the transmit-filter matrix, the corresponding receive-filter matrix is defined by equation (13)

$$[Rx_{filt}] = \{[U] \cdot [T]\}^H \quad (13)$$

The method of the present invention advocates setting the coefficients of the phase-rotation filter as per equations (14) and (15), such that the transmit-filter matrix of (12) can be written in the form of equation (16).

$$\alpha_1 = -\phi_{11} \quad (14)$$

$$\alpha_2 = -\phi_{12} \quad (15)$$

$$[Tx_{filt}] = \begin{bmatrix} v_{11} & v_{12} \\ v_{21} e^{j(\varphi_{21}-\varphi_{11})} & v_{22} e^{j(\varphi_{22}-\varphi_{12})} \end{bmatrix} \quad (16)$$

Representing, the coefficient $[Tx_{filt}]_{2,1}$ in the Cartesian coordinate system (which is the most common form of representing complex numbers in digital electronic systems), the feedback information is determined to be:

$$\text{Feedback\_Info\_Set} = \{a_{21}, b_{21}\} \quad (17)$$

where, $v_{21} e^{j(\varphi_{21}-\varphi_{11})} = a_{21} + jb_{21}$

According to the method of the present invention, instead of feeding back the right-handed singular-vector matrix [V], the receiver feeds back the information identified in equation (17) to the transmitter. Based on the unitary property of the [V] matrix, as depicted in equation (18), a set of relations can be derived (in advance) that recover a suitable transmit-filter matrix at the transmitter, from the feedback coefficients.

$$[V]^{-1} = [V]^H \quad (18)$$

In the case of the 2×2 example in this embodiment, the transmit steering matrix used by the BS is given by equation (19), where the individual elements can be represented in terms of the feedback coefficient in (17), by equations (20)~(23).

$$[\hat{T}x_{filt}] = \begin{bmatrix} [\hat{T}x_{filt}]_{1,1} & [\hat{T}x_{filt}]_{1,2} \\ [\hat{T}x_{filt}]_{2,1} & [\hat{T}x_{filt}]_{2,2} \end{bmatrix} \quad (19)$$

$$[\hat{T}x_{filt}]_{1,1} = +\sqrt{1 - a_{21}^2 - b_{21}^2} \quad (20)$$

$$[\hat{T}x_{filt}]_{1,2} = +\sqrt{a_{21}^2 + b_{21}^2} \quad (21)$$

$$[\hat{T}x_{filt}]_{2,1} = +a_{21} + jb_{21} \quad (22)$$

$$[\hat{T}x_{filt}]_{2,2} = -\frac{[\hat{T}x_{filt}]_{1,1}}{[\hat{T}x_{filt}]_{1,2}} \times [\hat{T}x_{filt}]_{2,1} \quad (23)$$

It would be apparent to one skilled in the art that the objective of the phase-rotation filter is to rotate the transmit-filter matrix to eliminate (or bring to some pre-determined form, that is known to both transmitter and receiver) the phase component of one element of every right-handed singular-vector (denoted by columns of the transmit-filter matrix). The choice of $\alpha_1$ and $\alpha_2$ in equations (14) and (15) of this example result in the first element of each singular-vector to lie along the positive real-axis of the Cartesian coordinate system in the complex number plane. In general, $\alpha_1$ and $\alpha_2$ may be chosen to constrain the first element of each singular-vectors to lie on (and in the direction of) a pre-determined vector in the complex number plane, there being one such pre-determined vector corresponding to each singular-vector. Even more generally, the above rule is not restricted to the first element of each singular-vector—i.e. it can just as well be applied to the second element (the second row of [V] in equation (9), in this example).

From the above description, it would be apparent that depending on the element of the singular-vector which is brought to pre-determined phase by the phase-rotation filter, [T]; and the choice of the element(s) to be fed-back, a set of relations that may be different from those in (20)~(23) can be derived using the unitary property depicted in equation (18). As these relations depend on an adopted convention, it is to be understood that the scope of the current invention is not limited by the convention adopted herein.

It would further be apparent to one skilled in the art that there are infinite solutions for the singular-vectors of a complex channel matrix. The phase-rotation filter helps select a solution having a particular form (corresponding to the pre-determined convention) from an input of any generic solution. It is to be understood that for ease of implementation, the effects of an explicit phase rotation filter may be integrated with the computation of the singular-vectors itself (e.g.: by selecting the solutions for [U] and [V] that take the desired predetermined form), without limiting the scope of the invention.

In this embodiment, we have illustrated the application of a reduced feedback (without loss of performance) eigen-beamforming scheme in the context of a 2×2 MIMO system. In accordance with the methods of the present invention, for a 2×2 MIMO system, feedback of one complex-coefficient is determined to be the minimum amount of information that can be used to determine the other coefficients of an appropriate transmit-filter matrix at the transmitter. Based on the current example, the feedback was limited to the information highlighted in equation (17). It can be concluded that after applying a suitable phase-rotation filter, to the generic singular-vector matrices obtained by the singular value decomposition of the channel estimate, the minimum amount of feedback information required to effect eigen-beamforming can be expressed by equation (24), which is one-quarter of the amount of feedback required as described by the present art as per equation (8)—a seventy-five percent reduction.

$$\text{Feedback\_Info}_{2_{Rx} \times 2_{Tx}} = 2 \times m \qquad (24)$$

Figure 2:
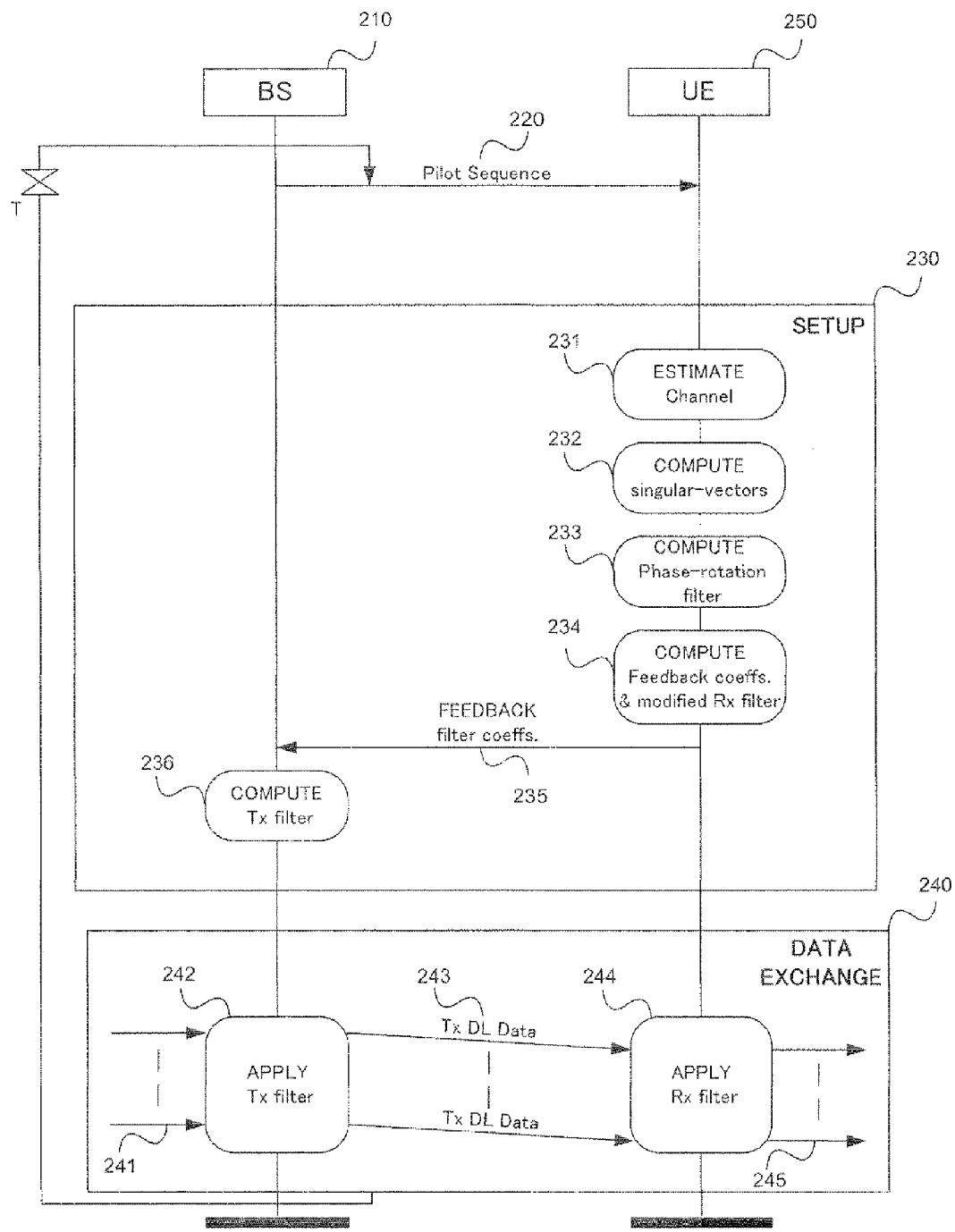
FIG. 2 is a chart showing an example of transmission/reception operation between a transmitter and a receiver according to one embodiment of the present invention.

FIG. 2 depicts a message sequence chart illustrating the set up and subsequent communication between two entities—BS 210 and UE 250, using the methods of the present invention. As is typical of most wireless networks, the BS periodically transmits a pilot sequence for a variety of reasons, ranging from advertising its presence to serving as a coherent reference for channel estimation, among others. For the purposes of the present invention, the pilot sequence 220 is used by the UE to estimate the downlink channel (i.e. the channel from the BS to UE).

As mentioned previously, typical wireless channels are selective in time, frequency and space. To counter the effects of time variation of the channel, the UE needs to periodically update the transmitter with channel state information. The UE estimates the channel conditions 231 from the transmitted pilot sequence 220 and computes the singular-vectors in step 232, to determine a set of transmit and receive filters, as described in the previous embodiment. The UE then determines an appropriate phase-rotation filter and performs phase-rotation on the left-handed singular-vector matrix and the right-handed singular-vector matrix in step 233 as per the methods of the present invention. Then the UE computes the modified receive-filter, which is the Hermitian matrix of the phase-rotated left-handed singular-vector matrix; and determines feedback coefficients in step 234. The feedback coefficients preferably includes filter coefficients which are associated with at least one of a plurality of elements in the phase-rotated right-handed singular-vector matrix. The feedback coefficients are fed-back in step 235 to the transmitter (BS), which computes the transmit-filter in step 236. Collectively, the steps of 231~236 are labeled as 'setup' and marked by reference numeral 230 in FIG. 2, as they result in the determination and transfer of feedback information; and not direct transmission of the payload data.

Upon completion of the setup phase 230, the BS can initiate high-rate downlink data transmission using eigen-mode spatial-multiplexing. This is described by the 'data-exchange' phase 240 which includes steps of 242~244 as explained below. In step 242, the transmitter—BS 210 applies the transmit-filter computed in step 236 to its data to be transmitted 241. Then, the data is transmitted as the transmitted signal (Tx DL Data) by the transmitter and is received by the receiver in step 243. In step 244, the receiver—UE 250 applies the modified receive-filter, computed in step 234, to the received signal received in step 243, to recover an estimate of the transmitted data 245.

It is anticipated that the UE 250 would perform the setup phase 230 periodically (at least once per coherence-time of the channel) in order to update the BS 210 with the most current set of transmit-filter coefficients. While the setup phase 230 encompasses several processes—depicted by reference numerals 231~236, it would be apparent to one skilled in the art that the UE may perform some of these functions more frequently than others. For example, the UE may compute the channel estimate in step 231 more frequently than transmitting feedback coefficients at step 235, feedback being performed only when a sufficient change in channel state is determined. As such, while FIG. 2 depicts a necessary set of processes required to effect reduced feedback eigen-mode spatial-multiplexing as per the methods of the present invention, it does not limit a specific implementation from performing additional intermediate steps—such as 'determining sufficient change in channel state before performing feedback'; or from performing certain processes more frequently than others.

Figure 3:
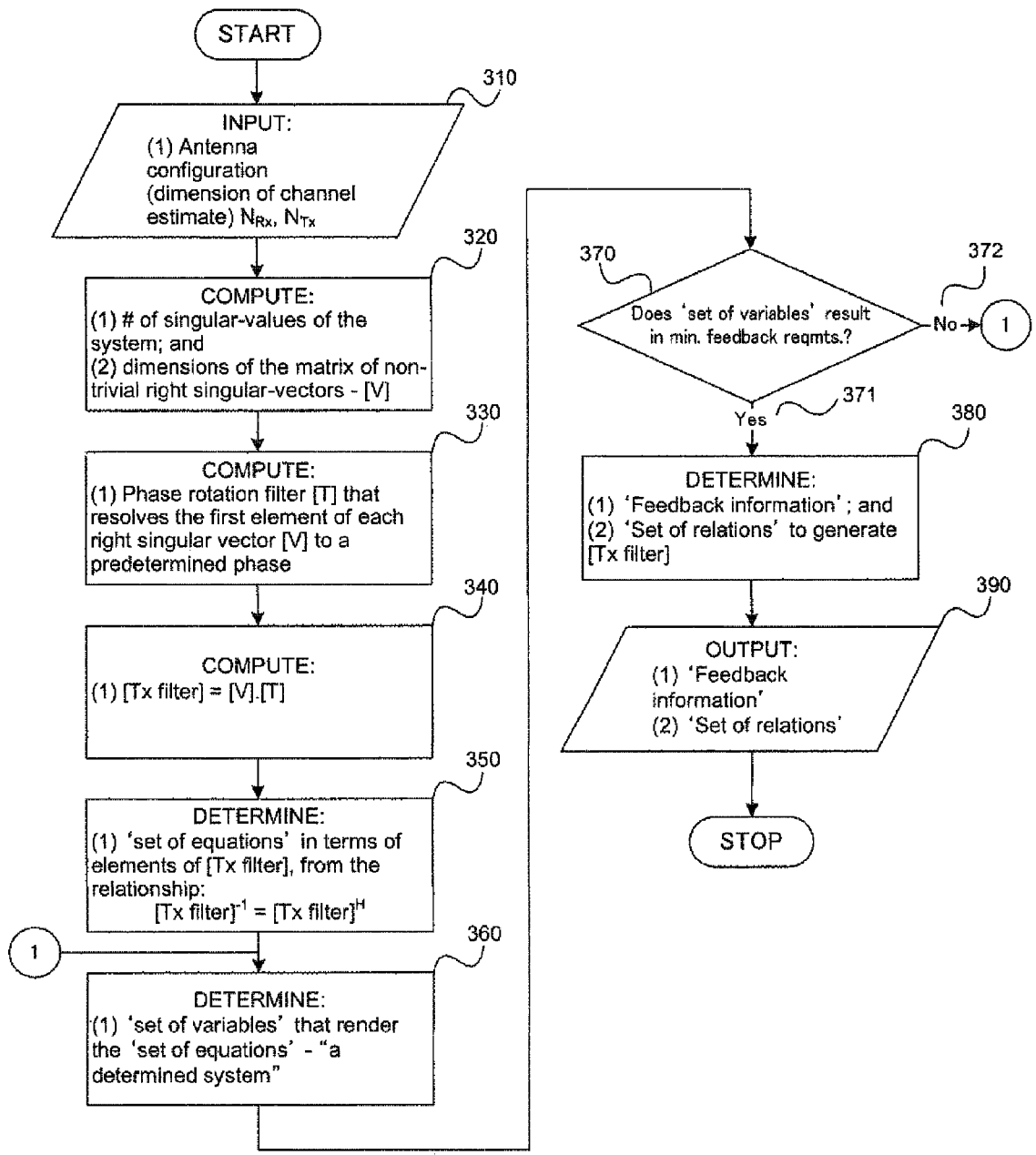
FIG. 3 is a flow chart showing a feedback information determination method according to one embodiment of the present invention.

The method described in the previous embodiment results in the best improvement (in terms of reduction in feedback) for a 2×2 MIMO system. For the more general case of an $N_{Rx} \times N_{Tx}$ antenna configuration, a similar approach may be applied—but with different gains (amounts of reduction in feedback). The general approach to determine the minimum feedback information required to compute the modified transmit-filter coefficients, as taught by the current invention is depicted in the flowchart of FIG. 3 and described in the following embodiment.

Step 310 specifies the inputs to the algorithm—the dimensions of the channel estimate matrix—equivalent to the antenna configuration of the transmitter and receiver. In step 320 the antenna configuration is used to determine the number of singular-values of the system and the dimensions of the matrix of non-trivial right-handed singular-vectors (equivalent to the 'economy-sized' singular value decomposition, as described in prior-art). In the process of step 330 a phase-rotation filter is determined that resolves the first element of the right-handed singular-vectors in step 320 to a predetermined phase (that is known to both transmitter and receiver). Based on the phase-rotation filter computed in step 330 and the right-handed singular-vector matrix computed in step 320, a transmit-filter is computed in the process of step 340.

In step 350, we determine a 'set of equations' in terms of the transmit-filter coefficients, by exploiting the unitary property of the transmit-filter. Typically, this 'set of equations' results in an under-determined system. Processes of the steps 360 and 370 deal with choosing the 'set of variables' that, if known, render the system determined. Path 371 is traversed if the 'set of variables' determined in the process of step 360 results in the minimum amount of feedback information. Alternately, traversing path 372 results in an iterative execution of the process of step 360 until the set of variables that determine the system with minimum feedback are found, as per the condition in step 370.

The process of step 380 determines the required feedback information between receiver and transmitter; and the 'set of relations' to be used by the transmitter to re-generate the transmit-filter using the 'feedback information', while step 390 outputs the results of the algorithm.

As an example of application of the invention to an asymmetric antenna configuration (i.e. one that does not yield a square matrix such as the 2×2 form described in a previous embodiment), we consider a system comprising of a transmitter (BS) having 4 antennae and a receiver (UE) having 2 antennae.

While the number of eigen-modes (and correspondingly independent data channels) that exist for this system is limited to 2, the presence of four transmit antennae facilitates the BS to use a mode of transmission that exploits additional diversity present in the channel to achieve a better performance than any system that advocates the use of only two (of the four available) transmit antennae. It should be noted that the present invention describes methods for reducing feedback information. As such, methods to determine the viability of using 4-transmit antennas or 2-transmit antennas, are beyond the scope of the present invention.

The matrices of right-handed and left-handed non-trivial singular vectors have dimension 4×2 and 2×2 and are depicted by equations (25) and (26), respectively. Note their equivalence to equations (9) and (10) for the previously-mentioned 2×2 system.

$$[V] = \begin{bmatrix} v_{11} e^{j\varphi_{11}} & v_{12} e^{j\varphi_{12}} \\ v_{21} e^{j\varphi_{21}} & v_{22} e^{j\varphi_{22}} \\ v_{31} e^{j\varphi_{31}} & v_{32} e^{j\varphi_{32}} \\ v_{41} e^{j\varphi_{41}} & v_{42} e^{j\varphi_{42}} \end{bmatrix} \quad (25)$$

$$[U] = \begin{bmatrix} u_{11} e^{j\varphi_{11}} & u_{12} e^{j\varphi_{12}} \\ u_{21} e^{j\varphi_{21}} & u_{22} e^{j\varphi_{22}} \end{bmatrix} \quad (26)$$

Choosing a phase rotation filter that resolves the first element of each right-singular vector in [V] to the positive real-axis of the complex number plane, as suggested by step 330, we obtain a phase rotation filter that has the same form as that in equation (11), with coefficients set according to equations (14) and (15) in the embodiment describing the 2×2 scenario.

The transmit filter for the 2×4 system is determined to be specified by equation (27), as described in step 340.

$$[V] = \begin{bmatrix} v_{11} & v_{12} \\ v_{21} e^{j(\varphi_{21}-\varphi_{11})} & v_{22} e^{j(\varphi_{22}-\varphi_{12})} \\ v_{31} e^{j(\varphi_{31}-\varphi_{11})} & v_{32} e^{j(\varphi_{32}-\varphi_{12})} \\ v_{41} e^{j(\varphi_{41}-\varphi_{11})} & v_{42} e^{j(\varphi_{42}-\varphi_{12})} \end{bmatrix} \quad (27)$$

Elucidating the 'set of equations', as per step 350, we obtain equations (28)~(31):

$$v_{11}^2 + v_{21}^2 + v_{31}^2 + v_{41}^2 = 1 \quad (28)$$

$$v_{12}^2 + v_{22}^2 + v_{32}^2 + v_{42}^2 = 1 \quad (29)$$

$$v_{11} \cdot v_{12} + v_{21} \cdot v_{22} \cdot e^{j(\phi_{21}-\phi_{11}-\phi_{22}+\phi_{12})} + v_{31} \cdot v_{32} \cdot e^{j(\phi_{31}-\phi_{11}-\phi_{32}+\phi_{32})} + v_{41} \cdot v_{42} \cdot e^{j(\phi_{41}-\phi_{11}-\phi_{42}+\phi_{42})} = 0 \quad (30)$$

$$v_{11} \cdot v_{12} + v_{21} \cdot v_{22} \cdot e^{-j(\phi_{21}-\phi_{11}-\phi_{22}+\phi_{12})} + v_{31} \cdot v_{32} \cdot e^{-j(\phi_{31}-\phi_{11}-\phi_{32}+\phi_{32})} + v_{41} \cdot v_{42} \cdot e^{-j(\phi_{41}-\phi_{11}-\phi_{42}+\phi_{42})} = 0 \quad (31)$$

Representing the transmit-filter in Cartesian coordinate form in equation (32), 'the set of equations' expressed by equations (28)~(31) can be expressed as in equations (33)~(36):

$$[Tx_{filt}] = \begin{bmatrix} a_{11}+jb_{11} & a_{12}+jb_{12} \\ a_{21}+jb_{21} & a_{22}+jb_{22} \\ a_{31}+jb_{31} & a_{32}+jb_{32} \\ a_{41}+jb_{41} & a_{42}+jb_{42} \end{bmatrix} \quad (32)$$

where, as a result of the phase-rotation filter, $b_{11}=b_{12}=0$.

$$a_{11}^2+a_{21}^2+a_{31}^2+a_{41}^2+b_{21}^2+b_{31}^2+b_{41}^2=1 \quad (33)$$

$$a_{12}^2+a_{22}^2+a_{32}^2+a_{42}^2+b_{22}^2+b_{32}^2+b_{42}^2=1 \quad (34)$$

$$a_{11}a_{12}+a_{21}a_{22}+a_{31}a_{32}+a_{41}a_{42}+b_{21}b_{22}+b_{31}b_{32}+b_{41}b_{42}=0 \quad (35)$$

$$a_{21}b_{22}+a_{31}b_{32}+a_{41}b_{42}-a_{22}b_{21}-a_{32}b_{31}-a_{42}b_{41}=0 \quad (36)$$

Using the process of determining a set of 'feedback information' and corresponding 'set of relations', as detailed by steps 360~380, it can be seen that the 'feedback information' as detailed by equation (37), when used in conjunction with a 'set of relations' derived from equations (33)~(36), are sufficient to determine the transmit-filter matrix in equation (32). As has been highlighted before, this is just one of several possible combinations of 'feedback information' that results in reduced feedback, in accordance with the methods of the invention.

Feedback_Info_Set={$a_{21},a_{31},b_{31},a_{41},b_{41},a_{22},b_{22},a_{32},b_{32},a_{42},b_{42}$} (37)

Based on the MIMO example with 4-transmit and 2-receive antennas in this embodiment, the use of the phase rotation filter and the methods of the present invention result in an amount of feedback information, as specified in equation (38)—a 31.25% reduction over the present-art, as specified by substituting NTX=4 and $N_{Rx}$=2, in (7).

Feedback_Info=11×m bits (38)

It would be apparent to one skilled in the art of non-linear programming, that a further reduction in the feedback information—for example, corresponding to the 'feedback information' specified by equation (39), can render a 'set of relations' that recover the transmit-filter.

Feedback_Info_Set={$a_{31},b_{31},a_{41},b_{41},a_{22},b_{22},a_{32},b_{32},a_{42},b_{42}$} (39)

However, due to the non-linear nature of the 'set of equations' in equations (33)~(36), the 'set of relations' determined above yields two solutions for the transmit-filter matrix-one of them being invalid. While the convention of the phase-rotation filter imposes a constraint on the transmit-filter (in the example of the present embodiment, this constraint forces the coefficients $a_{11}$ and $a_{12}$ to be positive and real), this constraint is found to be insufficient for selecting the valid solution for the transmit-filter matrix.

A further method of the present embodiment recognizes that the receiver may perform additional computation based on the knowledge of 'feedback information' and 'set of relations', as specified by step 380; to determine the set of solutions for the transmit-filter—as is performed by the transmitter in the present invention. By computing the true transmit-filter independently from the right-handed singular-vector matrix and the phase-rotation filter, a selection-signal is determined by the receiver. The selection-signal in this example constitutes 1-bit. The feedback of the selection-signal in conjunction with the information of equation (39), results in sufficient information for the transmitter to determine the valid transmit-filter.

This further method results in feedback corresponding to equation (40)—realizing a feedback reduction of about 37.5% over that of the present-art, as identified by equation (7).

$$\text{Feedback\_Info} = 10 \times m + 1 \text{ bits} \quad (40)$$

It is to be appreciated that the additional one-bit depicted in equation (40) may either be explicitly included in the feedback information of equation (39), or be embedded/encoded into a characteristic of the transmission from the receiver to the transmitter.

Figure 4:
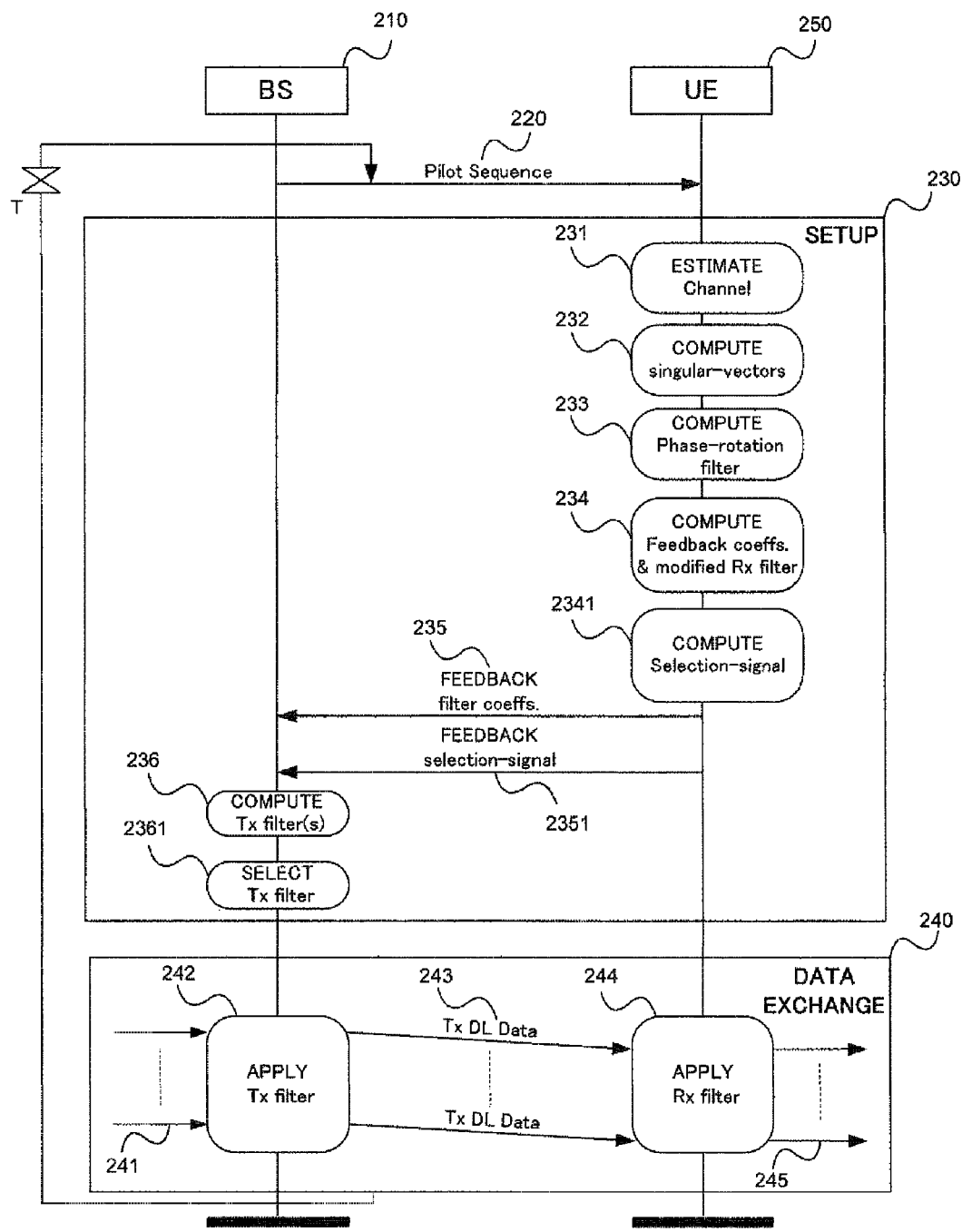
FIG. 4 is a chart showing a modified example of transmission/reception operation between a transmitter and a receiver according to one embodiment of the present invention.

The method of feeding back a selection signal to the transmitter, as highlighted by the present embodiment, results in a modification to the message sequence chart of FIG. 2—illustrated in FIG. 4, where, in addition to the steps of FIG. 2, step 2341 is performed by the receiver (UE) to compute the selection signal. The selection-signal is fed-back in step 2351—which depending on implementation, may or may not be part of the feedback information signal.

At the transmitter, step 236 results in more than one solution for the transmit-filter matrix, requiring step 2361 to select the valid transmit-filter, based on the selection-signal, allowing successful communication in the ensuing data-exchange phase 240.

Figure 5:
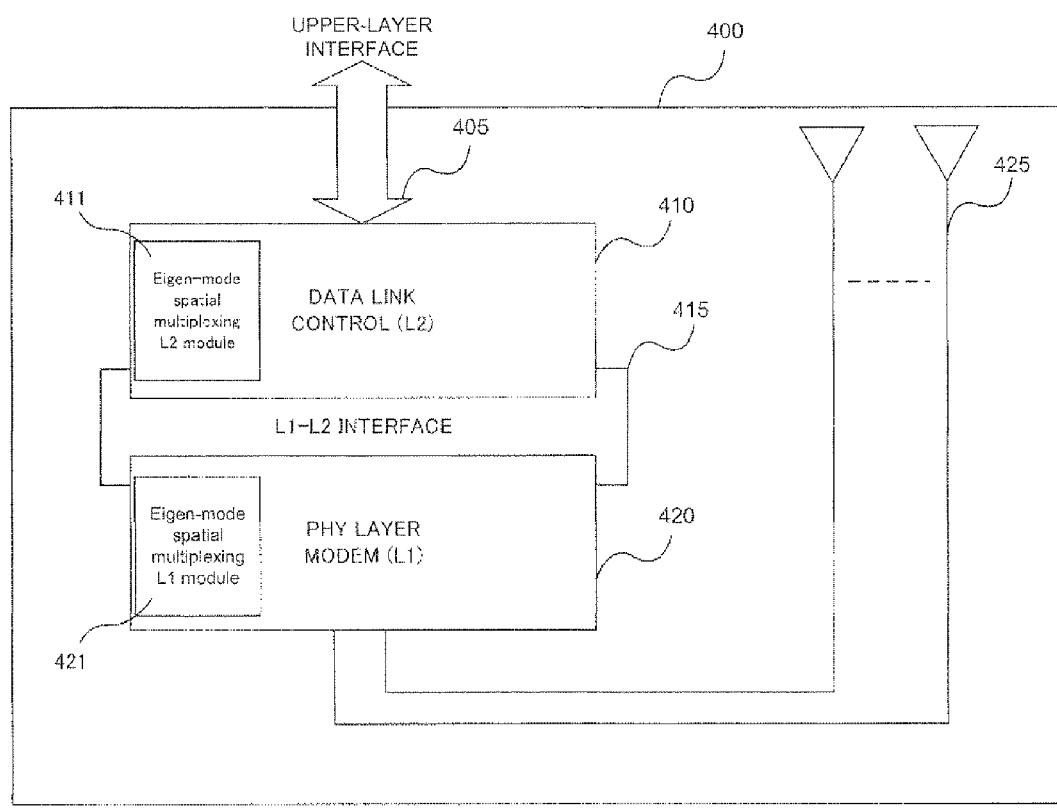
FIG. 5 is a block diagram showing a configuration of a multi-antenna terminal apparatus according to one embodiment of the present invention.

FIG. 5 depicts a multiple antenna transceiver apparatus that may be a typical abstraction of any individual station—110, 120, 130, or 140, in the MIMO wireless communication network 100; and embodies the methods of the present invention. Reference numeral 410 marks the layer-2 processor, which is responsible for data link control, while reference numeral 420 marks the layer-1 processor which is the physical layer modem—as per the ISO OSI 7-layer reference model. Reference numeral 415 depicts the interface between the layer-1 and layer-2 processors, while reference numeral 405 marks the interface to the upper-layer. Reference numeral 425 marks the antenna array, which serves as the interface between the station 400 and the wireless channel. It is further anticipated that the present invention would require additional modules to be implemented requiring functionality of both layer-1 and layer-2 processors. These additional modules are depicted by reference numerals 411 and 421 respectively.

In the context of the FDD communications system comprising of a BS communicating with a singularity or plurality of UE stations and using the eigen-mode spatial-multiplexing mode of transmission in the downlink, the methods taught by the embodiments associated with FIG. 3 are performed prior to the act of communication. Further, the format of the feedback information is known to both the BS and UE; while the set of relations required to derive the transmit-filter matrix is known to the BS in advance.

Assuming that FIG. 5 is an abstraction of a UE receiving an eigen-mode spatially multiplexed signal (e.g. terminals 120, 130 or 140), the module 411 has the capability of performing: determining the singular vectors (e.g. by a singular-value decomposition) of the channel estimate, determining an appropriate phase-rotation filter, computing the modified receive-filter and feedback coefficients, as depicted by steps 231, 232, 233 and 234 of FIG. 2, respectively. As per the method of the embodiments corresponding to FIG. 4, module 411 further has the capability of determining a selection-signal, as depicted in step 2341. Additionally module 411 is capable of performing a receive filter operation in step 244 using the previously computed receive-filter of step 234. Within the context of the UE, it is anticipated that the module 421 will implement the required protocol for signaling the feedback coefficients computed by module 411 and communicated to it via the interface 415; to the BS, as depicted in step 235. In accordance with the methods of the embodiments corresponding to FIG. 4, module 421 will further implement the required protocol for signaling the selection-signal determined by module 411 and communicated to it via the interface 415; to the BS, as depicted in step 2351.

Assuming that FIG. 5 is an abstraction of the BS transmitting an eigen-mode spatially multiplexed signal (e.g. central station 110), the module 421 is assumed to have the capability of interpreting the signaling information received as a result of the communication of step 235 and conveying this to the module 411 of the layer-2 processor 410. The layer-2 processor 410, in turn is capable of computing the transmit-filter as depicted by the step 236 and applying it at step 242 to subsequent downlink data communications during the data exchange phase 240. Further to the above, in accordance with the methods of embodiments corresponding to FIG. 4, the module 421 is capable of interpreting the selection-signal of step 2351 and conveying it to module 411 of the layer-2 processor 410. The layer-2 processor 410 is in turn capable of selecting the valid transmit-filter at step 2361 from the set of solutions for the transmit-filter computed by it in step 236.

A wireless reception apparatus according to the above-mentioned embodiment adopts a configuration comprising: a derivation section that derives a phase-rotated right-handed singular vector matrix from an estimation result of a MIMO channel; and a feedback section that feeds back, to a wireless transmission apparatus, a coefficient associated with an element of the phase-rotated right-handed singular vector matrix derived by said derivation section.

A wireless reception apparatus according to the above-mentioned embodiment adopts, in the above-mentioned configuration, a configuration wherein said derivation section comprises: a calculation section that calculates a right-handed singular vector matrix from the estimation result; and a phase rotation section that performs phase rotation on the right-handed singular vector matrix calculated by said calculation section to generate the phase-rotated right-handed singular vector matrix.

A wireless reception apparatus according to the above-mentioned embodiment adopts, in the above-mentioned configuration, a configuration wherein said phase rotation section determines a unitary matrix containing a diagonal element having a value corresponding to a point on a unit circle in a complex number plane, and performs phase rotation using the determined unitary matrix.

A wireless reception apparatus according to the above-mentioned embodiment adopts, in the above-mentioned configuration, a configuration wherein the right-handed singular vector matrix has a plurality of right-handed singular vectors, and said phase rotation section eliminates a phase component of an element in each of said plurality of right handed singular vectors.

A wireless reception apparatus according to the above-mentioned embodiment adopts, in the above-mentioned configuration, a configuration wherein the right-handed singular vector matrix has a plurality of right-handed singular vectors, each of which is assigned a corresponding reference vector in a complex number plane, and said phase rotation section rotates a phase component of an element in each of the plurality of right handed singular vectors to a direction of the corresponding reference vector.

A wireless reception apparatus according to the above-mentioned embodiment adopts, in the above-mentioned configuration, a configuration wherein: said phase rotation section rotates a phase component of one of a plurality of elements in each of the plurality of right-handed singular vectors to the direction of the corresponding reference vector, the plurality of elements being included in a single row of the right-handed singular vector matrix.

A wireless reception apparatus according to the above-mentioned embodiment adopts, in the above-mentioned configuration, a configuration wherein the right-handed singular vector matrix has a plurality of right-handed singular vectors, and said phase rotation section arranges an element in each of the plurality of right-handed singular vectors on a positive real axis of a coordinate system in a complex number plane.

A wireless reception apparatus according to the above-mentioned embodiment adopts, in the above-mentioned configuration, a configuration wherein: said phase rotation section arranges one of the plurality of elements in each of the plurality of right-handed singular vectors on the positive real axis, the elements being included in a single row of the right-handed singular vector matrix.

A wireless reception apparatus according to the above-mentioned embodiment adopts, in the above-mentioned configuration, a configuration wherein said calculation section further calculates a left-handed singular vector matrix from the estimation result, said phase rotation section performs phase rotation on the left-handed singular vector matrix calculated by said calculation section, and the apparatus further comprising: an application section that applies a conjugate transposed matrix of the left-handed singular vector matrix subjected to phase rotation by said phase rotation section to a received signal; to obtain an estimate of data transmitted from said wireless transmission apparatus.

A wireless reception apparatus according to the above-mentioned embodiment adopts, in the above-mentioned configuration, a configuration further comprising: a selection signal generation section that generates a selection signal based on which said transmission apparatus is allowed to obtain a valid solution of a plurality of solutions for a transmission filter to be applied to data to be transmitted to said wireless transmission apparatus, and said feedback section feeds back the selection signal generated by said selection signal generation section to said wireless transmission apparatus.

A wireless transmission apparatus according to the above-mentioned embodiment adopts, in the above-mentioned configuration, a configuration comprising: an acquisition section that acquires a coefficient which is fed back from a wireless reception apparatus; a generation section that generates a transmission filter by substituting the coefficient acquired by said acquisition section in a predetermined relation; and an application section that applies the transmission filter generated by said generation section to data to be transmitted to said wireless reception apparatus via a MIMO channel.

A wireless communication system according to the above-mentioned embodiment adopts a configuration comprising a wireless reception apparatus according to the present embodiment and a wireless transmission apparatus according to the present embodiment.

A wireless reception method according to the above-mentioned embodiment adopts a configuration comprising: a derivation step of deriving a phase-rotated right-handed singular vector matrix from an estimation result of a MIMO channel; and a feedback step of feeding back a coefficient associated with an element of the phase-rotated right-handed singular vector matrix derived in said derivation step.

A wireless transmission method according to the above-mentioned embodiment adopts a configuration comprising: an acquisition step of acquiring a fed-back coefficient; a generation step of generating a transmission filter by substituting the fed-back coefficient acquired in said acquisition step in a predetermined relation; and an application step of applying the transmission filter generated in said generation step to data to be transmitted via a MIMO channel.

A wireless communication method according to the above-mentioned embodiment adopts a configuration comprising a wireless reception method according to the present embodiment and a wireless transmission method according to the present embodiment Industrial Applicability A wireless reception apparatus, a wireless transmission apparatus, a wireless communication system, a wireless reception method, a wireless transmission method, and a wireless communication method of the present invention are applicable in wireless communications via a MIMO channel.

The invention claimed is:
1. A wireless reception apparatus comprising:
   a calculation section that calculates a right-handed singular vector matrix from an estimation result of a multiple input multiple output (MIMO) channel;
   a phase rotation section that performs phase rotation on the right-handed singular vector matrix calculated by the calculation section to generate a phase-rotated right-handed singular vector matrix, the phase rotation being performed by using a unitary matrix containing a diagonal element having a value corresponding to a point on a unit circle in a complex number plane; and
   a feedback section that feeds back, to a wireless transmission apparatus, information about a coefficient in the complex number plane, the coefficient being associated with an element of the phase-rotated right-handed singular vector matrix generated by the phase rotation section.

2. The wireless reception apparatus according to claim 1, wherein the right-handed singular vector matrix has a plurality of right-handed singular vectors, and the phase rotation section eliminates a phase component of an element in each of the plurality of right handed singular vectors.

3. The wireless reception apparatus according to claim 1, wherein:
   the calculation section further calculates a left-handed singular vector matrix from the estimation result; and the phase rotation section performs phase rotation on the left-handed singular vector matrix calculated by the calculation section, and the wireless reception apparatus further comprising:
an application section that applies, to a received signal, a conjugate transposed matrix of the left-handed singular vector matrix subjected to the phase rotation by the phase rotation section, to obtain an estimate of data transmitted from the wireless transmission apparatus.

4. A wireless reception apparatus comprising:
a calculation section that calculates a right-handed singular vector matrix from an estimation result of a multiple input multiple output (MIMO) channel, the right-handed singular vector matrix having a plurality of right-handed singular vectors, each of which is assigned a corresponding reference vector in a complex number plane;
a phase rotation section that performs phase rotation on the right-handed singular vector matrix calculated by the calculation section to generate a phase-rotated right-handed singular vector matrix, the phase rotation being performed by rotating a phase component of an element in each of the plurality of right handed singular vectors to a direction of the corresponding reference vector; and
a feedback section that feeds back, to a wireless transmission apparatus, information about a coefficient in the complex number plane, the coefficient being associated with an element of the phase-rotated right-handed singular vector matrix generated by the phase rotation section.

5. The wireless reception apparatus according to claim 4, wherein:
the phase rotation section rotates the phase component of one of a plurality of elements in each of the plurality of right-handed singular vectors to the direction of the corresponding reference vector, the plurality of elements being included in a single row of the right-handed singular vector matrix.

6. The wireless reception apparatus according to claim 4, wherein the right-handed singular vector matrix has a plurality of right-handed singular vectors, and the phase rotation section eliminates a phase component of an element in each of the plurality of right handed singular vectors.

7. The wireless reception apparatus according to claim 4, wherein:
the calculation section further calculates a left-handed singular vector matrix from the estimation result; and
the phase rotation section performs phase rotation on the left-banded singular vector matrix calculated by the calculation section, and the wireless reception apparatus further comprising:
an application section that applies, to a received signal, a conjugate transposed matrix of the left-handed singular vector matrix subjected to the phase rotation by the phase rotation section, to obtain an estimate of data transmitted from the wireless transmission apparatus.

8. A wireless reception apparatus comprising:
a calculation section that calculates a right-handed singular vector matrix from an estimation result of a multiple input multiple output (MIMO) channel, the right-handed singular vector matrix having a plurality of right-handed singular vectors;
a phase rotation section that performs phase rotation on the right-handed singular vector matrix calculated by the calculation section to generate a phase-rotated right-handed singular vector matrix, the phase rotation being performed by arranging an element in each of the plurality of right-handed singular vectors on a positive real axis of a coordinate system in a complex number plane; and
a feedback section that feeds back, to a wireless transmission apparatus, information about a coefficient in the complex number plane, the coefficient being associated with an element of the phase-rotated right-handed singular vector matrix generated by the phase rotation section.

9. The wireless reception apparatus according to claim 8, wherein:
the phase rotation section arranges one of a plurality of elements in each of the plurality of right-handed singular vectors on the positive real axis, the elements being included in a single row of the right-handed singular vector matrix.

10. The wireless reception apparatus according to claim 8, wherein the right-handed singular vector matrix has a plurality of right-handed singular vectors, and the phase rotation section eliminates a phase component of an element in each of the plurality of right handed singular vectors.

11. The wireless reception apparatus according to claim 8, wherein:
the calculation section further calculates a left-handed singular vector matrix from the estimation result; and
the phase rotation section performs phase rotation on the left-handed singular vector matrix calculated by the calculation section, and the wireless reception apparatus further comprising:
an application section that applies, to a received signal, a conjugate transposed matrix of the left-handed singular vector matrix subjected to the phase rotation by the phase rotation section, to obtain an estimate of data transmitted from the wireless transmission apparatus.

12. A wireless communication system comprising a wireless reception apparatus and a wireless transmission apparatus, wherein:
the wireless reception apparatus comprises:
a calculation section that calculates a right-handed singular vector matrix from an estimation result of a multiple input multiple output (MIMO) channel;
a phase rotation section that performs phase rotation on the right-handed singular vector matrix calculated by the calculation section to generate a phase-rotated right-handed singular vector matrix, the phase rotation being performed by using a unitary matrix containing a diagonal element having a value corresponding to a point on a unit circle in a complex number plane; and
a feedback section that feeds back, to said wireless transmission apparatus, information about a coefficient in the complex number plane, the coefficient being associated with an element of the phase-rotated right-handed singular vector matrix generated by the phase rotation section, and
the wireless transmission apparatus comprises:
an acquisition section that acquires the information which is fed back from the wireless reception apparatus;
a generation section that generates a transmission filter using the information acquired by the acquisition section; and
an application section that applies the transmission filter generated by the generation section to data, to be transmitted to the wireless reception apparatus via the MIMO channel.

13. A wireless reception method comprising:
calculating a right-handed singular vector matrix from an estimation result of a multiple input multiple output (MIMO) channel;
performing phase rotation on the calculated right-handed singular vector matrix to generate a phase-rotated right-handed singular vector matrix, the phase rotation being performed by using a unitary matrix containing a diagonal element having a value corresponding to a point on a unit circle in a complex number plane; and
feeding back information about a coefficient in the complex number plane, the coefficient being associated with an element of the phase-rotated right-handed singular vector matrix generated by the phase rotation.

14. A wireless communication method comprising:
calculating a right-handed singular vector matrix from an estimation result of a multiple input multiple output (MIMO) channel;
performing phase rotation on the calculated right-handed singular vector matrix to generate a phase-rotated right-handed singular vector matrix, the phase rotation being performed by using a unitary matrix containing a diagonal element having a value corresponding to a point on a unit circle in a complex number plane;
feeding back information about a coefficient in the complex number plane, the coefficient being associated with an element of the phase-rotated right-handed singular vector matrix generated by the phase rotation;
generating a transmission filter using the fed back information; and
applying the generated transmission filter to data to be transmitted via the MIMO channel.

* * * * *